US012691613B2

(12) United States Patent
    Hofmann et al.

(10) Patent No.: US 12,691,613 B2
(45) Date of Patent: Jul. 28, 2026

(54) METHOD FOR SIMULATING A FIBER ORIENTATION IN AN INJECTION-MOLDED PART MADE OF A FIBER-REINFORCED PLASTIC, AND DESIGN METHOD FOR DESIGNING AN INJECTION-MOLDED PART MADE OF A FIBER-REINFORCED PLASTIC

(71) Applicant: Robert Bosch GmbH, Stuttgart (DE)

(72) Inventors: Susanne Hofmann, Feuerbach (DE);
               Argha Protim Dey, Stuttgart (DE);
               Armin Kech, Stuttgart (DE); **Camilo
               Andres Cruz Bernal**, Renningen (DE);
               Tim A. Osswald, Madison, WI (US)

(73) Assignee: ROBERT BOSCH GMBH, Stuttgart
               (DE)

( * ) Notice: Subject to any disclaimer, the term of this
             patent is extended or adjusted under 35
             U.S.C. 154(b) by 932 days.

(21) Appl. No.: 17/802,644

(22) PCT Filed: Apr. 7, 2021

(86) PCT No.: PCT/EP2021/059092
    § 371 (c)(1),
    (2) Date: Aug. 26, 2022

(87) PCT Pub. No.: WO2021/204893
    PCT Pub. Date: Oct. 14, 2021

(65) Prior Publication Data
    US 2023/0339155 A1      Oct. 26, 2023

(30) Foreign Application Priority Data
    Apr. 9, 2020    (DE) ..................... 10 2020 204 586.0

(51) Int. Cl.
    *B29C 45/00*        (2006.01)
    *B29C 45/76*        (2006.01)
    (Continued)

(52) U.S. Cl.
    CPC ...... *B29C 45/0005* (2013.01); *B29C 45/7693*
            (2013.01); *G06F 30/20* (2020.01);
            (Continued)

(58) Field of Classification Search
    CPC ........... B29C 45/0005; B29C 45/7693; B29C
            2945/7629; B29C 2945/76949;
            (Continued)

(56) References Cited

U.S. PATENT DOCUMENTS

2012/0330627 A1*  12/2012  Tseng .................. B29C 45/7693
                                                            703/2

FOREIGN PATENT DOCUMENTS

EP         1253491 A2    10/2002

OTHER PUBLICATIONS

Wu, Ke, et al. "Numerical simulation of the injection molding
process of short fiber composites by an integrated particle approach."
The International Journal of Advanced Manufacturing Technology
97.9 (2018): 3479-3491 (Year: 2018).*
(Continued)

*Primary Examiner* — Saif A Alhija
(74) *Attorney, Agent, or Firm* — NORTON ROSE
FULBRIGHT US LLP

(57)            ABSTRACT

A method for simulating a fiber orientation in an injection-molded part made of a fiber-reinforced plastic. An orientation of the fibers in the injection-molded part to be manufactured that is present after the injection molding is determined via a macroscopic simulation of the injection molding. The macroscopic simulation of the injection molding takes place using macroscopic physical parameters of the fiber-reinforced plastic. In the macroscopic simulation, a temporal development of the fiber orientation tensor is determined via a combination of two macroscopic models. A first temporal development of the fiber orientation tensor
(Continued)

is determined via a first macroscopic model based on shear flows. A second temporal development of the fiber orientation tensor is determined via a second macroscopic model based on elongation flows. The method is applied in a method for designing an injection-molded part made of a fiber-reinforced plastic.

10 Claims, 2 Drawing Sheets

(51) Int. Cl.
　　*B29K 105/06*　　　(2006.01)
　　*G06F 30/20*　　　(2020.01)
　　*G06F 113/26*　　　(2020.01)
(52) U.S. Cl.
　　CPC ................. *B29C 2945/7629* (2013.01); *B29C 2945/76949* (2013.01); *B29C 2945/76979* (2013.01); *B29K 2105/06* (2013.01); *G06F 2113/26* (2020.01)
(58) Field of Classification Search
　　CPC ........... B29C 2945/76979; B29C 45/76; G06F 30/20; G06F 2113/26; G06F 30/25; G06F 30/27; G06F 30/28; B29K 2105/06
　　See application file for complete search history.

(56) References Cited

OTHER PUBLICATIONS

Huang, Jinhua, and R. T. Haftka. "Optimization of fiber orientations near a hole for increased load-carrying capacity of composite laminates." Structural and Multidisciplinary Optimization 30.5 (2005): 335-341 (Year: 2005).*

Yashiro, Shigeki. "Application of particle simulation methods to composite materials: a review." Advanced Composite Materials 26.1 (2017): 1-22 (Year: 2017).*

Van Rooijen, R. G. J., et al. "The bearing strength of fiber metal laminates." Journal of composite materials 40.1 (2006): 5-19 (Year: 2006).*

Chen, Hongyu, Peter Wapperom, and Donald G. Baird. "The use of flow type dependent strain reduction factor to improve fiber orientation predictions for an injection molded center-gated disk." Physics of Fluids 31.12 (2019) (Year: 2019).*

Lambert, et al.: "Obtaining short-fiber orientation model parameters using non-lubricated squeeze flow," Physics of Fluids, 29(12), (2017), pp. 121608-1-121608-11.

Li and Luye: "Optimization of Fiber Orientation Model Parameters in the Presence of Flow-Fiber Coupling," Journal of Composites Science, 2(4), (2018), pp. 1-17.

Yun, et al.: "Learning the Macroscopic Flow Model of Short Fiber Suspensions from Fine-Scale Simulated Data," Entropy, 22(30), (2020), pp. 1-13.

International Search Report for PCT/EP2021/059092, Issued Jun. 29, 2021.

Kugler et al., "Efficient Parameter Identification for Macroscopic Fiber Orientation Models With Experimental Data and a Mechanistic Fiber Simulation," Proceedings of the 35th International Conference of the Polymer Processing Society (pp. 35), AIP Conference Proceedings, vol. 2205, No. 020050, 2020, pp. 1-5. https://aip.scitation.org/doi/pdf/10.1063/1.5142965> Downloaded Aug. 16, 2022.

Tesch, "On Invariants of Fluid Mechanics Tensors," Task Quarterly, vol. 17, No. 3-4, 2013, pp. 223-230. <https://task.gda.pl/files/quart/TQ2013/03-04/tq217n-e.pdf> Downloaded Aug. 16, 2022.

Kugler et al., "Macroscopic Fiber Orientation Model Evaluation for Concentrated Short Fiber Reinforced Polymers in Comparison to Experimental Data," Polymer Composites, vol. 41, No. 172, 2020, pp. 1-15. <https://ur.booksc.me/book/81371578/d82392> Downloaded Aug. 16, 2022.

Lambert et al., "Evaluating Rigid and Semiflexible Fiber Orientation Evolution Models in Simple Flows," Journal of Manufacturing Science and Engineering, Transactions of the ASME, vol. 139, Issue 3, 2017, pp. 1-7. <https://citeseerx.ist.psu.edu/viewdoc/download?doi=10.1.1.1054.4014&rep=rep1&type=pdf> Downloaded Aug. 16, 2022.

Linström et al., "Simulation of the Motion of Flexible Fibers in Viscous Fluid Flow," Physics of Fluids, vol. 19, No. 11, 2007, pp. 113307. <https://www.researchgate.net/publication/241449048_Simulation_of_the_motion_of_flexible_fibers_in_viscous_fluid_flow> Downloaded Aug. 16, 2022.

Kromkamp et al., "Shear-Induced Self-Diffusion and Microstructure in Non-Brownian Suspensions at Non-Zero Reynolds Numbers," Journal of Fluid Mechanics, vol. 529, 2005, pp. 253-278. <https://core.ac.uk/download/pdf/29282022.pdf> Downloaded Aug. 16, 2022.

Tseng et al., "The Use of Principal Spatial Tensor to Predict Anisotropic Fiber Orientation in Concentrated Fiber Suspensions," Journal of Rheology, vol. 62, No. 1, 2017, pp. 312-320.

Cheng et al., "Flow Field Characterization in a Banbury Mixer," International Polymer Processing, vol. 5, Issue 3, 1990, pp. 178-183.

Schneider, "The Sequential Addition and Migration Method to Generate Representative Volume Elements for the Homogenization of Short Fiber Reinforced Plastics," Computational Mechanics, vol. 59, No. 2, 2017, pp. 247-263.

Yamane et al., "Numerical Simulation of Semi-Dilute Suspensions of Rodlike Particles in Shear Flow," Journal of Non-Newtonian Fluid Mechanics, vol. 54, 1994, pp. 405-421.

* cited by examiner

METHOD FOR SIMULATING A FIBER ORIENTATION IN AN INJECTION-MOLDED PART MADE OF A FIBER-REINFORCED PLASTIC, AND DESIGN METHOD FOR DESIGNING AN INJECTION-MOLDED PART MADE OF A FIBER-REINFORCED PLASTIC

FIELD

The present invention relates to a method for simulating a fiber orientation in an injection-molded part made of a fiber-reinforced plastic, an orientation of the fibers in the injection-molded part to be manufactured that is present after the injection molding being determined via a macroscopic simulation of the injection molding, and the macroscopic simulation of the injection molding taking place using macroscopic physical parameters of the fiber-reinforced plastic. A further aspect of the present invention relates to a design method for designing an injection-molded part made of a fiber-reinforced plastic.

BACKGROUND INFORMATION

Plastic parts, in particular glass fiber-reinforced plastic parts, are frequently used in industrial applications. In particular in the automotive field, numerous parts made of fiber-reinforced plastics are used, with fiber-reinforced thermoplastic plastics in particular increasingly replacing parts made of metal. Due to the fiber reinforcement, the plastic parts have good mechanical properties with reduced weight and lower costs. In particular, there is an option for manufacturing such plastic parts quickly and cost-effectively using an injection molding process.

Computer simulations are typically used in the design of such fiber-reinforced plastic parts to allow the failure behavior and the life expectancy of a plastic part to be estimated. The arrangement and in particular the orientation of the fibers in the finished part are an important criterion for the behavior of the fiber-reinforced plastic parts. Similarly, how the fibers are distributed, arranged, and/or oriented in the finished part is an important component of a simulation of the properties of a fiber-reinforced plastic part. In the simulation of parts that are manufactured by injection molding, in particular the flow conditions during the filling operation of the mold must be taken into account, since the subsequent orientation of the fibers results from the flow conditions.

For simulating the fiber orientation, complex micromechanical models (micromodels) are available which operate using simulation methodologies such as the discrete element method (DEM), the smoothed particle methodology, or the moving particle semi-implicit (MPS) method. A problem with these simulation methodologies is that they are very complicated, and generally can be carried out only for reference volumes having a typical size of 500 μm$^3$.

So-called macromodels or macroscopic models are available for simulating the injection molding process. These macroscopic models for computing the fiber orientation model effects such as diffusion, reduced deformation, anisotropic diffusion, and excluded volume effects. The predictive accuracy is greatly dependent on the selected phenomenological parameters (macroscopic physical parameters). The pARD-RSC model is described in the related art. The model is described in the paper by H. -C. Tseng, R. -Y. Chang, and C. -H. Hsu, "The use of principal spatial tensor to predict anisotropic fiber orientation in concentrated fiber suspensions," Journal of Rheology, Vol. 62, No. 1, pp. 312-320, 2017. The model is a function of at least three macroscopic physical parameters: diffusion $C_I$, retarding rate κ, and the degree of anisotropy Ω. These parameters are globally defined before the simulation is carried out.

The accuracy in determining the fiber orientation during injection molding, using the existing macromodels, is inadequate. Micromodels are more accurate, but are not feasible in a conventional finite element method (FEM) simulation due to the high computational effort.

In the related art, methods are available in which macroscopic physical parameters for a macroscopic model are obtained via a micromechanical model by simulating shearing of a material cell and subsequent fitting. Such a method is described, for example, in S. K. Kugler et al., "Efficient parameter identification for macroscopic fiber orientation models with experimental data and a mechanistic fiber simulation," AIP Conference Proceedings 2205, 020050 (2020); https://doi.org/10.1063/1.5142965. It is disadvantageous that in actual injection molding processes, in addition to shear flows, elongation flows also occur which cannot be taken into account using the conventional simulation methods.

SUMMARY

According to an example embodiment of the present invention, a method for simulating a fiber orientation in an injection-molded part made of a fiber-reinforced plastic is provided, an orientation of the fibers in the injection-molded part to be manufactured that is present after the injection molding being determined via a macroscopic simulation of the injection molding, and the macroscopic simulation of the injection molding taking place using macroscopic physical parameters of the fiber-reinforced plastic. In addition, it is provided that in the macroscopic simulation, a temporal development of fiber orientation tensor $\dot{A}$ is determined via a combination of two macroscopic models, a first temporal development of fiber orientation tensor $\dot{A}_s$ being determined via a first macroscopic model based on shear flows, and a second temporal development of fiber orientation tensor $\dot{A}_e$ being determined via a second macroscopic model based on elongation flows.

A geometry of the injection-molded part to be manufactured or of the corresponding injection mold is preferably predefined for the simulation. In addition, process parameters such as the temperature at which the injection molding takes place are preferably predefined for the simulation.

The fiber-reinforced plastic includes a plurality of fibers that are embedded in a matrix material. The matrix material is a thermoplastic plastic, for example.

The matrix material is preferably a thermoplastic plastic such as polyether ether ketone (PEEK), polyphenylene sulfide (PPS), polysulfone (PSU), polyetherimide (PEI), polytetrafluoroethylene (PTFE), polybutylene terephthalate (PBT), or a polyamide (PA). The fibers are selected, for example, from inorganic fibers such as glass fibers, organic fibers such as aramid fibers, or carbon fibers or natural fibers.

The fibers may be, for example, short fibers having a length of less than 1000 μm, preferably in the range of 100 μm to 500 μm. Diameter 2r of the fibers is in the range of 5 μm to 50 μm, for example.

The material properties of the fiber-reinforced plastic are predefined via the macroscopic physical parameters of the macroscopic models.

The fiber orientation tensor indicates the main orientation direction of the fibers of an ensemble of fibers, for example the fibers of a material cell under consideration for the simulation, and is given by $$A_{ij}(t) = \frac{\sum_{n=1}^{N} p_{n,j}(t) p_{n,i}(t)}{N}$$

where $A_{ij}$ are the components of the orientation tensor, $p_n(t)$ is the position of fiber n at time t, and N indicates the number of fibers in the ensemble under consideration. Indices i and j refer to the components of vector p that describes the position of the fiber.

According to an example embodiment of the present invention, the macroscopic simulation is preferably a computer simulation that determines the fiber orientation during the injection molding, using a macroscopic model. The macroscopic model is the pARD-RSC model, for example, but other macroscopic models and combinations of multiple such models may additionally or alternatively be used, in particular RSC, ARD, pARD, MRD, and/or RPR.

The computer simulation may take place, for example, using standard software such as the Moldflow software from Autodesk or the open source software OpenFOAM. In the case of the Moldflow software, a user interface (Solver API) may be used to define the macroscopic model, in particular the pARD-RSC model, that is utilized. The fiber orientation may be subsequently determined and computed in the software via the self-defined model, using the macroscopic physical parameters.

In the method it is preferably provided that weighting of the influence of the first model and of the second model on the temporal development of fiber orientation tensor $\dot{A}$, determined in the simulation, is carried out based on Manas-Zloczower number $M_z$, a lower value of the Manas-Zloczower number being limited to a value of 0.5 that corresponds to the case of a pure shear flow, and an upper value of 1 that corresponds to a pure elongation flow.

Manas-Zloczower number $M_z$ provides information concerning the type of flow. A value of 0 corresponds to pure rotation, a value of 0.5 corresponds to pure shearing, and a value of 1 corresponds to pure elongation.

For example, a formulation by Cheng, J. J. and Manas-Zloczower, I., "Flow Field Characterization in a Banbury Mixer," International Polymer Processing, Vol. 5, Issue 3, pp. 178-183, 1990, may be utilized for the computation. The Manas-Zloczower number is defined via third invariant $\dot{\gamma}$ of strain rate tensor D and third invariant $\dot{\omega}$ of vorticity tensor W. Strain rate tensor D is given as the symmetrical portion of velocity gradient $\nabla u$ having velocity u:

$$D = \frac{1}{2}\left(\nabla u + \nabla u^T\right)$$

$$\dot{\gamma} = \sqrt{D{:}D}$$

The vorticity tensor is given as the skew-symmetric portion of velocity gradient $\nabla u$ having velocity u:

$$W = \frac{1}{2}\left(\nabla u - \nabla u^T\right)$$

To compute the third invariant of vorticity tensor W, for example a formulation by Krzysztof Tesch, described in the publication by K. Tesch, "On invariants of fluid mechanics tensors," Task Quarterly, Vol. 17, No. 3-4, pp. 1000-1008, 2013, may be used. This requires spin tensor $\vec{\Omega}$, which is computed as follows:

$$\vec{\Omega} = \nabla \times u$$

Third invariant $\dot{\omega}$ of vorticity tensor W is then defined via the vector norm of spin tensor $\vec{\Omega}$.

Manas-Zloczower number $M_z$ is then defined by $$M_z = \frac{\dot{\gamma}}{\dot{\gamma} + \dot{\omega}}$$

Since rotation-dominated flows are not part of the dominant flows in the injection molding, the value 0.5 is preferably defined as a lower bound for Manas-Zloczower number $M_z$, so that all values less than 0.5 are set to the value 0.5. This results in the temporal development of fiber orientation tensor $\dot{A}$ via the relationship $$\dot{A} = 2(M_z - 0.5)\dot{A}_e + 2(1 - M_z)\dot{A}_s$$

The pARD-RSC model is preferably used as the macroscopic model, so that the first temporal development of fiber orientation tensor $\dot{A}_s$ and the second temporal development of fiber orientation tensor $\dot{A}_e$ are accordingly determined in each case via the pARD-RSC model. Alternatively or additionally, further models understood by those skilled in the art may be used.

The temporal development of fiber orientation tensor $\dot{A}^{pARD-RSC}$ determined by the pARD-RSC model is predefined by the pARD-RSC model, the model being described, for example, in H. -C. Tseng, R. -Y. Chang, and C. -H. Hsu, "The use of principal spatial tensor to predict anisotropic fiber orientation in concentrated fiber suspensions," Journal of Rheology, Vol. 62, No. 1, pp. 312-320, 2017.

The temporal development of fiber orientation tensor $\dot{A}^{pARD-RSC}$ determined by the pARD-RSC model has the form $$\dot{A}^{pARD-RSC} = (W \cdot A - A \cdot W) + \zeta\{D \cdot A + A \cdot D - 2[\mathbb{A} + (1-\kappa)(\mathbb{L} - \mathbb{M}{:}\mathbb{A})]{:}D\} + \dot{\gamma}\{2[C - (1-\kappa)\mathbb{M}{:}C] - 2\kappa(tr\ C)A - 5(C \cdot A + A \cdot C) + 10[\mathbb{A} + (1-\kappa)(\mathbb{L} - \mathbb{M}{:}\mathbb{A})]{:}C\}$$

where tr C denotes the trace of diffusion matrix C. In one variant of the pARD-RSC model, diffusion matrix C is described via diffusion $C_I$ and the degree of anisotropy $\Omega$:

$$C = C_I R_A \begin{pmatrix} 1 & 0 & 0 \\ 0 & \Omega & 0 \\ 0 & 0 & 1-\Omega \end{pmatrix} R_A^T$$

In this specific embodiment of the present invention, the macroscopic model includes the three macroscopic physical parameters $C_I$, $\Omega$, and $\kappa$. Alternatively, instead of the parameter anisotropy $\Omega$, a complex model having the parameters D1, D2, and D3 may be selected:

$$C = C_I R_A \begin{pmatrix} D_1 & 0 & 0 \\ 0 & D_2 & 0 \\ 0 & 0 & D_3 \end{pmatrix} R_A^T$$

The pARD-RSC model is preferably employed using the four macroscopic physical parameters $C_I$, $D_2$, $D_3$, and $\kappa$. $D_1$ is set to the value 1 to avoid overdetermination.

$R_A$ is an eigenmatrix that is defined via $$A = R_A \begin{pmatrix} \lambda_1 & 0 & 0 \\ 0 & \lambda_2 & 0 \\ 0 & 0 & \lambda_3 \end{pmatrix} R_A^T$$

Tensors $\mathbb{L}$ and $\mathbb{M}$ of the pARD-RSC model have the form $$\mathbb{L} = \sum_{i=1}^3 \lambda_i e_i e_i e_i e_i$$

$$\mathbb{M} = \sum_{i=1}^3 e_i e_i e_i e_i$$

using eigenvectors $e_i$.

Parameter $\xi$ is the shape factor, which via fiber aspect ratio $r_e$ is given by $$\zeta = \frac{r_e^2 - 1}{r_e^2 + 1}$$

The first temporal development of the fiber orientation tensor is preferably correspondingly given by $$\dot{A}_s = \dot{A}_s^{pARD-RSC}(C_I^s, D_2^s, D_3^s, k^s)$$

using first macroscopic physical parameters $$C_I^s, D_2^s, D_3^s, k^s,$$

and describes the portion of the temporal development of the fiber orientation that is driven by the shear flows. The second temporal development of the fiber orientation tensor is correspondingly given by $$\dot{A}_e = \dot{A}_e^{pARD-RSC}(C_I^e, D_2^e, D_3^e, k^e)$$

using second macroscopic physical parameters $$C_I^e, D_2^e, D_3^e, \kappa^e,$$

and describes the portion of the development of the fiber orientation tensor that is driven by the elongation flows.

The first macroscopic physical parameters for the first macroscopic model and/or the second macroscopic physical parameters for the second macroscopic model may be determined via experimentally ascertained data, for example.

An experimental determination of the macroscopic physical parameters for the portion of the development of the fiber orientation tensor that is driven by shear flows may take place, for example, via a sliding plate experiment as described in the publication by S. Kugler et al., "Macroscopic fiber orientation model evaluation for concentrated short fiber reinforced polymers in comparison to experimental data," Polymer Composites, 2020.

An experimental determination of the macroscopic physical parameters for the portion of the development of the fiber orientation tensor that is driven by elongation flows may be obtained, for example, by considering a lubricated squeeze flow through a rectangular channel, as described in the publication by G. Lambert et al., "Evaluating Rigid and Semiflexible Fiber Orientation Evolution Models in Simple Flows," Journal of Manufacturing Science and Engineering, Transactions of the ASME, Vol. 139, Issue 3, 03 2017.

Alternatively or additionally, it is possible to ascertain the first macroscopic physical parameters for the first macroscopic model and/or the second macroscopic physical parameters for the second macroscopic model via a micromechanical simulation.

For determining the macroscopic physical parameters from experimental data or from data of a micromechanical simulation, for example a fit algorithm or an adaptation algorithm may be used which adapts the corresponding parameters of the macroscopic model in such a way that the prediction of the temporal progression of the orientation tensor made by the macroscopic model corresponds as closely as possible to the temporal progression of the orientation tensor that is determined via the simulation or via the experiment. The basic process of determining macroscopic physical parameters from a micromechanical simulation is described, for example, in S. K. Kugler et al., "Efficient parameter identification for macroscopic fiber orientation models with experimental data and a mechanistic fiber simulation," AIP Conference Proceedings 2205, 020050 (2020); https://doi.org/10.1063/1.5142965.

The micromechanical simulation is preferably carried out using the discrete element method (DEM), the smoothed particle methodology, or the moving particle semi-implicit (MPS) method.

The ascertainment of the first and/or the second macroscopic physical parameters using a micromechanical model preferably includes a method having the following sequence:

In a step a), a material cell including an ensemble of individual fibers that are embedded in a matrix material is formed, the fiber volume content and the fiber length being predefined as input values.

In a subsequent step b), a micromechanical simulation is carried out in which the material cell is sheared at a predefined shear rate for a predefined period of time, or is stretched at a predefined elongation rate, at least the positions of the fibers of the ensemble being determined for each time increment of the simulation, interaction forces between two fibers in each case being determined during the micromechanical simulation, for at least a portion of the fiber-fiber interactions a pure interaction force being determined via a trained machine learning model, using the input parameters of interaction angle, fiber aspect ratio, and the distance between the fibers, and the interaction force being determined from the pure interaction force, using a linear relationship between the viscosity of the matrix material and the relative velocity between the fibers.

According to an example embodiment of the present invention, as preparation for the micromechanical simulation, in step a) of the method a material cell is formed which includes an ensemble of individual fibers. The material cell is stored, for example, in a memory of a computer that carries out the subsequent micromechanical simulation. The material cell is formed as a function of the input parameters of the simulation, which include the fiber volume content and the fiber length. These input values represent the fiber-reinforced plastic material to be simulated. In particular for a normalization of the parameters, in addition the fiber diameter and/or a fiber aspect ratio may be indicated as an input value. The number of fibers and/or the size of the material cell are/is preferably selected in such a way that the simulation is sufficiently meaningful, and at the same time the computational effort remains limited. For example, the formed ensemble includes a range of 100 to 1000 fibers in the shear flow. For example, 500 individual fibers are generated for the ensemble. In the elongation flow, ensembles in the range of 1000 to 20,000 fibers are customary.

The predefined parameters such as the fiber volume content, the fiber length, and/or the fiber diameter or a fiber aspect ratio are taken into account in forming the ensemble. All fibers of the ensemble may have the same length and/or the same diameter. However, it is preferably provided that a distribution function is predefined for the fiber length and/or the fiber diameter. If a fiber aspect ratio is predefined, it may also be indicated in the form of a distribution function. The distribution function may be, for example, a normal distribution having an average value and a standard deviation. However, other distribution functions such as a bimodal distribution are also possible, for example when two different types of fibers, each with different lengths and/or diameters, are used. A suitable algorithm for forming a material cell using an ensemble of fibers is described, for example, in the publication by M. Schneider, "The sequential addition and migration method to generate representative volume elements for the homogenization of short fiber reinforced plastics," Computational Mechanics, Vol. 59, No. 2, pp. 247-263, 2017. The cell preferably has a cubic design for the shear simulation, and is selected in such a way that it has periodic boundary conditions on all sides. For the elongation simulation, rectangular cells having a height that is up to five times greater than the width are used.

The micromechanical simulation is carried out in step b) of the method. In the case of determining the macroscopic physical parameters for the portion that is driven by shear flows, the material cell previously formed in step a) is sheared at a predefined shear rate for a predefined period of time. A suitable shear rate is $1\ s^{-1}$, for example, and a suitable period of time is 100 s, for example.

In the case of determining the macroscopic physical parameters for the portion that is driven by elongation flows, the material cell previously formed in step a) is stretched at a predefined elongation rate. A suitable elongation rate is $0.05\ s^{-1}$, for example, and a suitable period of time is 100 s, for example.

The simulation is carried out in a stepwise manner, a certain time period of the simulation corresponding to each time increment. The duration of the time increment is preferably numerically adapted in the model via an adaptive incremental control.

In addition to the previously formed material cell, the input parameters of the micromechanical simulation include the viscosity of the matrix material. The matrix material is a polymer, preferably a thermoplastic polymer, and the fibers of the ensemble are embedded in the matrix material. Since the viscosity of the matrix material is a temperature-dependent parameter, for carrying out the simulation, the viscosity is preferably indicated for the temperature that is to be used in the injection molding of the fiber-reinforced plastic. The viscosity is also a function of the shear rate, and is preferably predefined for the shear rate that is selected for the simulation.

The micromechanical simulation includes an interaction model for the fibers in the viscous matrix material. In the simulation, at least the position of each fiber of the ensemble is computed in each time increment, preferably taking into account the effect of the hydrodynamic, interaction, and elastic forces.

In addition to the positions of the fibers of the ensemble, further parameters such as the velocities, the angular orientations, and/or the angular velocities of the fibers are also preferably computed. Combinations of multiple of these parameters or computing all of the stated parameters are/is also possible.

For the simulation, the individual fibers may be represented, for example, as a chain of cylindrical rods that are connected to one another via ball joints. A similar model is described, for example, by the paper by S. Linström and T. Uesaka, "Simulation of the motion of flexible fibers in viscous fluid flow," Physics of Fluids, Vol. 19, No. 11, p. 113307, 2007.

The trained machine learning model links the input parameters of interaction angle, fiber aspect ratio, and the distance between the fibers to the corresponding interaction force for these input parameters. The input parameters are preferably initially normalized, and maximum considered distance d between two fibers is preferably used for this purpose by the micromechanical simulation. This maximum considered distance d is preferably indicated in relation to diameter 2r of the fibers. When the fibers have a diameter distribution, the average fiber diameter is preferably used as a reference value here.

The machine learning model is trained for input parameters using a constant viscosity $\eta$ of the matrix material and a constant relative velocity $v_{rel}$ between the two involved fibers, so that the machine learning model outputs a pure interaction force as an output value. Interaction forces for some other viscosity and/or some other relative velocity are determined from the pure interaction force via the linear relationship between the interaction force and the viscosity and relative velocity.

The interaction forces preferably take into account the lubrication forces between two fibers in each case. In addition, forces during a mechanical contact in the transition area of the surface roughness and forces during mechanical contact are preferably taken into account. The transition area of the surface roughness includes distances between two fibers in each case in the range of approximately 1 μm.

Suitable models for taking into account the interaction forces in the transition area of the surface roughness and the forces during mechanical contact are described by S. Linström and T. Uesaka, "Simulation of the motion of flexible fibers in viscous fluid flow," Physics of Fluids, Vol. 19, No. 11, p. 113307, 2007.

For taking into account the lubrication forces, analytical models are available for only two special cases. In a first special case, the two involved fibers are regarded as two cylinders aligned in parallel and having a length L. An analytical model for the first special case is described by J. Kromkamp et al., "Shear-induced self-diffusion and microstructure in non-Brownian suspensions at non-zero Reynolds numbers," Journal of Fluid Mechanics, Vol. 529, pp. 253-278, 2005.

In a second special case, the two involved fibers are regarded as two cylinders of infinite length, having a contact angle $\alpha > 0$. An analytical model for the second special case is described by Y. Yamane et al., "Numerical simulation of semi-dilute suspensions of rodlike particles in shear flow," Journal of Non-Newtonian Fluid Mechanics, Vol. 54, pp. 405-421, 1994.

If the particular situation of the two fibers does not correspond to either of these two special cases, for example because short fibers are involved which are not aligned in parallel to one another, at least in these cases the interaction forces are preferably ascertained using a trained machine learning model.

For training the machine learning model, analytical solutions for the lubrication forces and/or numerical solutions for the lubrication forces are preferably used as training data, the training data in each case assigning an interaction force to the three input parameters of interaction angle, fiber aspect ratio, and the distance between the fibers.

For obtaining numerical solutions for the lubrication forces, for example a fully coupled computational fluid dynamics (CFD) particle simulation may be carried out for two fibers in the viscous matrix material. In such a simulation, the setting parameters are varied, it being possible for the setting parameters to include in particular the interaction angle, fiber length, fiber diameter, and distance between the fibers. Instead of fiber length and fiber diameter, a fiber aspect ratio (length divided by diameter) may also preferably be varied.

The interaction angle is preferably varied over the full range of 0° to 90°. The dimensions of the fibers, i.e., their length and/or diameter and thus their aspect ratio, are preferably varied in the range in which the dimensions of the fibers that are used for the injection molding are situated. The distance between the fibers is preferably considered in the area of mechanical contact of the fibers up to a distance that corresponds to the diameter of the fibers. The simulation for the approximation for small distances is therefore generally considered to be in the range of the fiber diameter (typically 10 μm).

The simulation may also be used to confirm the linear relationship with respect to the viscosity of the matrix material and the relative velocity. In this case, these parameters may likewise be varied in the simulation.

In one example, a fully coupled CFD particle simulation for two fibers in viscous matrix material was carried out using the COMSOL Multiphysics® modeling software, and the parameters of interaction angle, fiber length, matrix viscosity, and relative velocity between the fibers were varied as described. Using the obtained simulation data, the analytical relationships were checked, and it was possible to show that the interaction forces are linear with respect to the relative velocity and with respect to the viscosity of the matrix material. The dependency of the interaction angle, fiber length, and distance between the fibers is nonlinear.

The relationships between the interaction force and the input parameters obtained using the micromechanical simulation are preferably used as training data for the machine learning model. Alternatively or additionally, the analytical solutions that are available for the two described special cases may be used to create training data for the machine learning model. In this case as well, the input parameters of the analytical solutions are varied to obtain the corresponding interaction forces for various combinations of input parameters.

According to an example embodiment of the present invention, for the case that the training data include only numerical solutions, it is preferred that the interaction between two fibers is divided into multiple classes as a function of the interaction angle and the fiber length, for at least one of the classes the interaction force being analytically computed, and for at least one further class the interaction force being determined using the trained machine learning model.

In particular when the training data include only numerical solutions, the interactions may be divided into three different classes as a function of the interaction angle and the fiber length. The first two classes correspond to the two described special cases, for which analytical solutions exist in each case. Thus, the first class corresponds to the first special case in which the fibers extend in parallel, and interaction angle α is thus 0. The second class corresponds to the second special case in which the fibers are very long, so that they may be understood as cylinders of infinite length. The third class then corresponds to short fibers that do not extend in parallel to one another.

A particularly simple division into two classes may take place solely via the interaction angle. For the case that the interaction angle is 0° or approximately 0° (first special case), the analytical solution is relied on. In all other cases, the numerical solution via the artificial neural network is relied on.

If the training data include numerical solutions as well as analytical solutions, it is preferred that the interaction forces of all fiber-fiber interactions are determined using the trained machine learning model.

According to an example embodiment of the present invention, the machine learning model is preferably designed as an artificial neural network. Such an artificial neural network generally includes an input layer and an output layer, it being possible for one or multiple intermediate layers to be situated between the input layer and the output layer. The input layer receives the input values, and the output layer outputs the output value(s).

The provided artificial neural network preferably includes an input layer having three input values. A first input value is preferably a normalized interaction angle that has been normalized to the interval [0,1], for example by applying the function $\sin(\alpha)$ (interaction angle $\alpha$ between 0° and 90°). A second input value is preferably a fiber length that is normalized using the maximum considered distance. As a result of selecting fiber diameter 2r as the maximum considered distance, the second input value is an aspect ratio $L/(2r)$ formed from fiber length L and fiber diameter 2r. A third input value is a normalized distance $d/(2r)$ (using distance d between the two fibers and the maximum considered distance of 2r).

For an activation function of the artificial neural network, it may be more advantageous for the input values to be distributed around 0. Correspondingly, analytical stretching of the input values over the interval [−1,1] preferably takes place, for example by applying a function such as $f(x)=2x−1$. The input values that have a standard deviation of 1 and that are normalized to the interval [−1,1] would be most advantageous.

The provided artificial neural network preferably includes an output layer having an output value. The output value is preferably a pure interaction force that is associated with the input values of the normalized interaction angle, the normalized fiber length (or aspect ratio), and the normalized distance.

The training of the artificial neural network may take place using the training data, for example via supervised learning, use being made of the fact that the desired result (the pure interaction force) for the corresponding input parameters is known from the training data set. In the training, a training data set that includes numerically obtained solutions for the pure interaction force is preferably relied on.

A further aspect of the present invention relates to a design method for designing an injection-molded part made of a fiber-reinforced plastic, a simulation of the fiber orientation being carried out using one of the methods described herein, a load-bearing capacity of the injection-molded part being determined, and the determined load-bearing capacity being compared to a predefined load-bearing capacity.

If it is recognized that the part does not meet the requirements, it is preferred to change, in particular to increase, geometric parameters of the injection-molded part such as a wall thickness, and to carry out the simulation anew. It may also be provided that the simulation is repeated using changed geometric parameters when the load-bearing capacity of the injection-molded part exceeds the requirements by more than a predefined limiting value. The material requirements may thus be optimized, for example by decreasing a wall thickness of the injection-molded part.

By use of the provided hybrid model, which combines a first macroscopic model based on shear flows with a second macroscopic model based on elongation flows, the conditions that are present during the injection molding may be precisely detected, and improved accuracy in determining the fiber orientation in the injection-molded part may thus be achieved.

Due to the improved accuracy of the simulation, it may be used in particular for the design and conceptualization of injection-molded parts made of fiber-reinforced plastics. For example, geometric dimensions of the injection-molded part, such as a wall thickness, may be optimized in the design in response to the results of the simulation.

The used macroscopic physical parameters may advantageously be ascertained using micromechanical simulation, so that the simulation or the macroscopic models used for this purpose may be quickly adapted to changed materials, in particular it being possible to quickly adapt the fiber volume content, the fiber length, and the matrix material. The design process for corresponding parts made of fiber-reinforced plastic is simplified, and a prediction of the durability of the part is improved.

BRIEF DESCRIPTION OF THE DRAWINGS

Specific embodiments of the present invention are explained in greater detail with reference to the figures and the following description.

DETAILED DESCRIPTION OF EXAMPLE EMBODIMENTS

Figure 1:
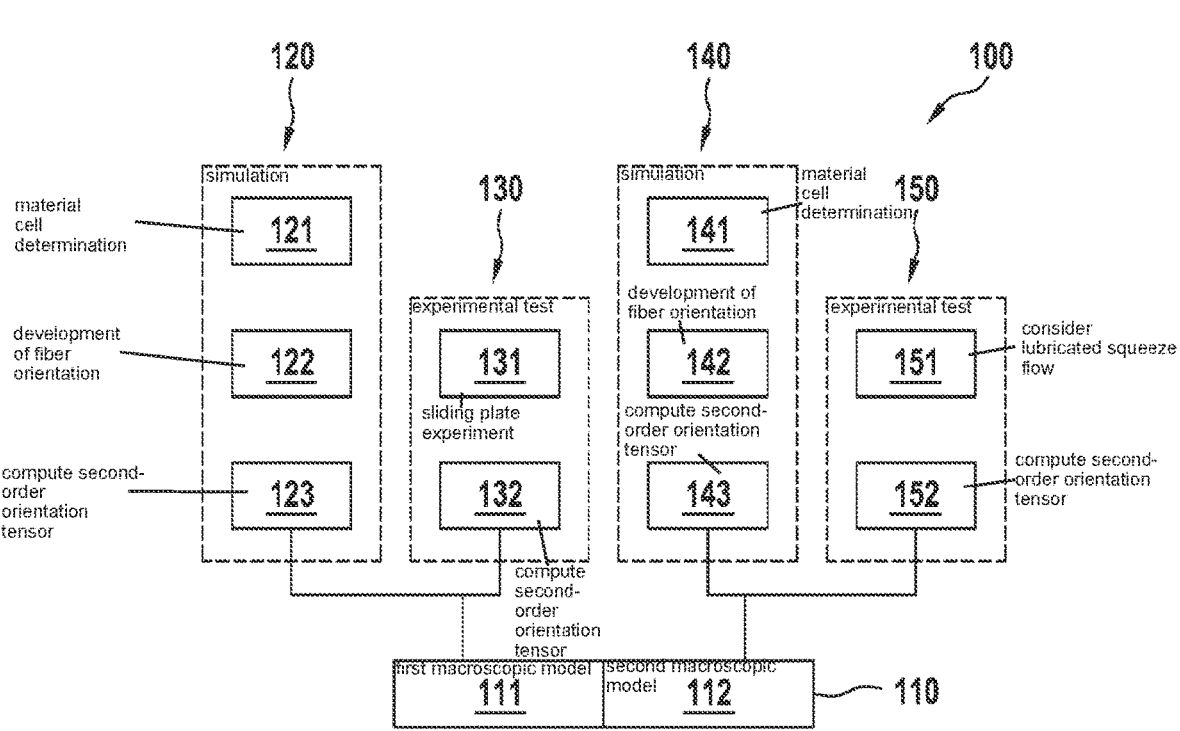
FIG. 1 shows a schematic flowchart of a detail of the method for simulating a fiber orientation in an injection-molded part made of a fiber-reinforced plastic, according to an example embodiment of the present invention.

In the following description of the specific example embodiments of the present invention, identical or similar elements are denoted by the same reference numeral, and a repeated description of these elements is dispensed with in individual cases. The subject matter of the present invention is illustrated only schematically in the figures.

FIG. 1 shows a schematic flowchart with a detail of a method 100 for simulating a fiber orientation in an injection-molded part made of a fiber-reinforced plastic. The detail of method 100 shown in FIG. 1 shows the sequence of determining macroscopic physical parameters for use in a hybrid macroscopic model 110 that includes a first macroscopic model 111 and a second macroscopic model 112.

First macroscopic model 111 is used for determining a first temporal development of fiber orientation tensor $\mathring{A}_s$, first macroscopic model 111 determining the development based on shear flows. Second macroscopic model 112 is used for determining a second temporal development of fiber orientation tensor $\mathring{A}_e$, second macroscopic model 112 determining the development based on elongation flows.

First macroscopic model 111 uses first macroscopic physical parameters as input parameters, and second macroscopic model 112 uses second macroscopic physical parameters as input parameters. These parameters may be obtained in each case by a micromechanical simulation 120, 140 or by carrying out experimental tests 130, 150.

The first macroscopic parameters for first macroscopic model 111 may be obtained via a first micromechanical simulation 120 by forming, in a material cell determination step 121, a material cell including an ensemble made up of individual fibers for a certain predefined fiber-reinforced plastic material. The fiber volume content, the fiber length, and the viscosity of the matrix material at the predefined shear rate and at the temperature at which the injection molding is to take place are used as input values here. The material cell is preferably cubical, and has periodic boundary conditions on all sides.

The development of the fiber orientation in the material cell is micromechanically simulated in a subsequent simulation step 122. The created material cell is sheared, for example, for 100 s at a shear rate of 1 s⁻¹. The simulation takes place, for example, based on the discrete element method (DEM), an interaction model for fiber-fiber interactions in a viscous medium being adapted. In the simulation, the position of each fiber is computed in each time increment, in particular interaction forces between two fibers in each case being taken into account. For determining these interaction forces, a trained machine learning model that is designed as an artificial neural network 200, for example (cf. FIG. 2), is preferably used at least for a portion of the fiber-fiber interactions. For each time increment, at least the positions of the fibers of the material cell are computed via the micromechanical model.

The second-order orientation tensor is computed from the positions of the fibers in a postprocessing step 123. The orientation tensor indicates the main orientation direction of the entirety of the fibers of the material cell. In addition, the optimal fit for the first macroscopic physical parameters of first macroscopic model 111 is computed from the temporal development of the components of the orientation tensor, for example using a fit algorithm or an adaptation algorithm.

In the case of a first experimental test 130, for example a sliding plate experiment is carried out on a sample of the fiber-reinforced plastic in a first testing step 131. The orientation of the fibers is subsequently measured.

The second-order orientation tensor is computed from the measured positions of the fibers in a postprocessing step 132. The orientation tensor indicates the main orientation direction of the entirety of the fibers of the material cell. In addition, the optimal fit for the first macroscopic physical parameters of first macroscopic model 111 is computed from the temporal development of the components of the orientation tensor, for example using a fit algorithm or an adaptation algorithm.

The second macroscopic parameters for second macroscopic model 112 may be obtained via a second micromechanical simulation 140 by forming, in a material cell determination step 141, a material cell including an ensemble made up of individual fibers for a certain predefined fiber-reinforced plastic material, as already described with regard to the first macroscopic physical parameters. The fiber volume content, the fiber length, and the viscosity of the matrix material and the temperature for the process conditions at which the injection molding is to take place are used as input values here. The material cell is preferably rectangular, with a height that is up to five times greater than the width, and includes walls on four sides and has open boundary conditions on two sides.

The development of the fiber orientation in the material cell is micromechanically simulated in a subsequent simulation step 142. The created material cell is stretched at a predefined rate, the simulation being carried out basically as already described with regard to determining the first macroscopic physical parameters.

The second-order orientation tensor is computed from the positions of the fibers in a postprocessing step 143. The orientation tensor indicates the main orientation direction of the entirety of the fibers of the material cell. In addition, the optimal fit for the second macroscopic physical parameters of second macroscopic model 112 is computed from the temporal development of the components of the orientation tensor, for example using a fit algorithm or an adaptation algorithm.

In the case of a second experimental test 150, for example an experimental consideration of the lubricated squeeze flow is carried out on a sample of the fiber-reinforced plastic in a testing step 151. The orientation of the fibers is subsequently measured.

The second-order orientation tensor is computed from the measured positions of the fibers in a postprocessing step 152. The orientation tensor indicates the main orientation direction of the entirety of the fibers of the material cell. In addition, the optimal fit for the second macroscopic physical parameters of second macroscopic model 112 is computed from the temporal development of the components of the orientation tensor, for example using a fit algorithm or an adaptation algorithm.

Weighting between first macroscopic model 111 and second macroscopic model 112 is carried out when hybrid macroscopic model 110 is used. The Manas-Zloczower number, which describes the type of flow that is present, is preferably used as a weighting parameter.

Figure 2:
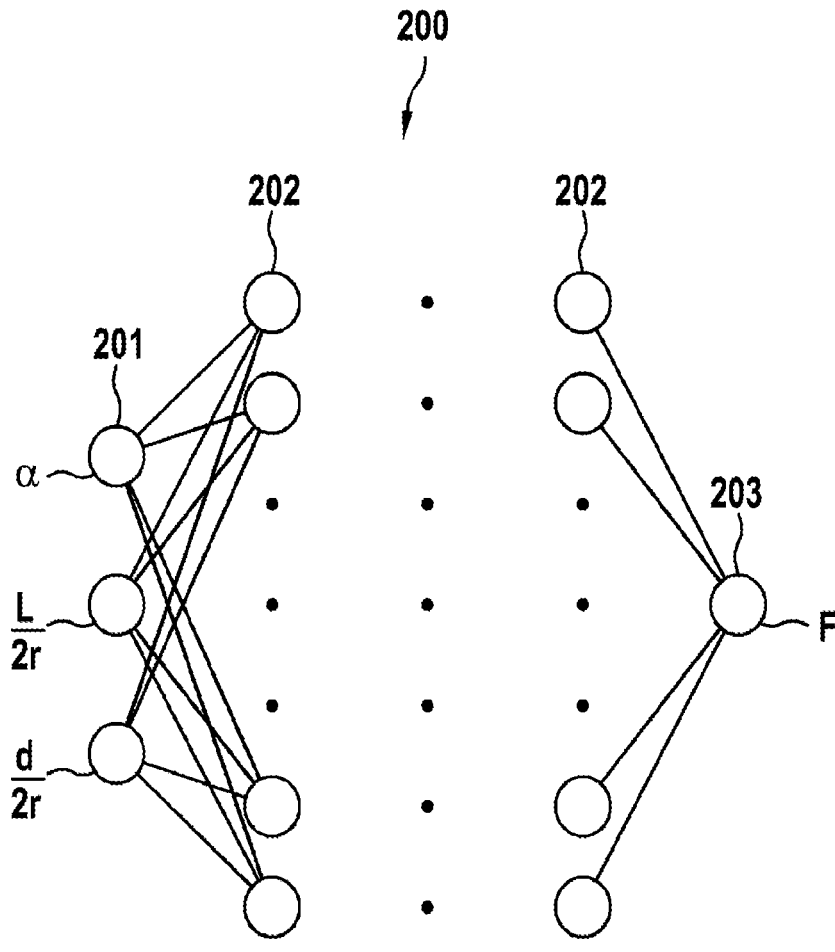
FIG. 2 shows a schematic illustration of an artificial neural network for use in a micromechanical simulation.

FIG. 2 shows a schematic illustration of an artificial neural network 200. Artificial neural network 200 is used to determine in each case a pure interaction force between two fibers of the material cell for micromechanical simulation 120, 140 (cf. FIG. 1).

In the example illustrated in FIG. 2, artificial neural network 200 includes an input layer 201 having three input values. A first input value is a normalized interaction angle $\alpha$. A second input value is a normalized fiber length, or for normalization to the fiber diameter, is an aspect ratio $L/(2r)$ that is formed from fiber length L and fiber diameter 2r. A third input value is a normalized distance $d/(2r)$ (using distance d between the two fibers and the maximum considered distance of 2r).

Provided artificial neural network 200 preferably includes an output layer 203 having an output value. In the illustrated example, the output value is a pure interaction force F that is associated with the input values.

Multiple intermediate layers 202 are situated between output layer 203 and input layer 201 in the illustrated example. As a result of the training of artificial neural network 200 using training data, in particular weightings of neurons of intermediate layers 202 and/or their linking to one another are adapted.

The present invention is not limited to the exemplary embodiments described here and the aspects highlighted therein. Rather, numerous modifications are possible which are within the scope of activities carried out by those skilled in the art, in view of the disclosure herein.

What is claimed is:

1. A method for simulating a fiber orientation in an injection-molded part made of a fiber-reinforced plastic, the method comprising:

determining an orientation of the fibers in the injection-molded part to be manufactured that is present after the injection molding via a macroscopic simulation of the injection molding, and the macroscopic simulation of the injection molding taking place using macroscopic physical parameters of the fiber-reinforced plastic, wherein in the macroscopic simulation:

determining a temporal development of a fiber orientation tensor via a combination of two macroscopic models, a first temporal development of the fiber orientation tensor being determined via a first macroscopic model of the two macroscopic models based on shear flows, and a second temporal development of the fiber orientation tensor being determined via a second macroscopic model of the two macroscopic models based on elongation flows; and carrying out a weighting of an influence of the first macroscopic model and of the second macroscopic model on the temporal development of the fiber orientation tensor, determined in the simulation, based on a Manas-Zloczower number, limited to an upper value of 1 that corresponds to a pure elongation flow.

2. The method as recited in claim 1, wherein the Manas-Zloczower number is limited to a lower value of 0.5 that corresponds to a case of a pure shear flow.

3. The method as recited in claim 1, wherein first macroscopic physical parameters for the first macroscopic model and/or second macroscopic physical parameters for the second macroscopic model are determined via experimentally ascertained data.

4. The method as recited claim 1, wherein first macroscopic physical parameters for the first macroscopic model and/or second macroscopic physical parameters for the second macroscopic model are ascertained via a micromechanical simulation.

5. The method as recited in claim 4, wherein the micromechanical simulation is carried out using a discrete element method (DEM), or a smoothed particle methodology, or a moving particle semi-implicit (MPS) method.

6. A method for simulating a fiber orientation in an injection-molded part made of a fiber-reinforced plastic, the method comprising:

determining an orientation of the fibers in the injection-molded part to be manufactured that is present after the injection molding via a macroscopic simulation of the injection molding, and the macroscopic simulation of the injection molding taking place using macroscopic physical parameters of the fiber-reinforced plastic, wherein in the macroscopic simulation:

determining a temporal development of a fiber orientation tensor via a combination of two macroscopic models, a first temporal development of the fiber orientation tensor being determined via a first macroscopic model of the two macroscopic models based on shear flows, and a second temporal development of the fiber orientation tensor being determined via a second macroscopic model of the two macroscopic models based on elongation flows;

wherein first macroscopic physical parameters for the first macroscopic model and/or second macroscopic physical parameters for the second macroscopic model are ascertained via a micromechanical simulation;

wherein the ascertainment of the first and/or second macroscopic physical parameters using the micromechanical simulation includes the following steps:

a) forming a material cell including an ensemble of individual fibers that are embedded in a matrix material, fiber volume content and fiber length being predefined as input values, b) carrying out the micromechanical simulation in which the material cell is sheared at a predefined shear rate for a predefined period of time, or the material cell is stretched at a predefined elongation rate, at least the positions of the fibers of the ensemble being determined for each time increment of the simulation, interaction forces between two fibers in each case being determined during the micromechanical simulation, for at least a portion of the fiber-fiber interactions a pure interaction force being determined via a trained machine learning model, using input parameters of interaction angle, fiber aspect ratio, and distance between the fibers, and an interaction force being determined from a pure interaction force, using a linear relationship between viscosity of the matrix material and a relative velocity between the fibers.

7. The method as recited in claim 6, wherein the interaction forces take into account lubrication forces between two fibers in each case.

8. The method as recited in claim 7, wherein for training the machine learning model, analytical solutions for the lubrication forces and/or numerical solutions for the lubrication forces are used as training data, the training data in each case assigning an interaction force to the input parameters of the interaction angle, the aspect ratio, and the distance between the fibers.

9. The method as recited in claim 6, wherein the machine learning model is an artificial neural network.

10. A method for designing an injection-molded part made of a fiber-reinforced plastic, the method comprising:

carrying out a simulation of fiber orientation including:

determining an orientation of the fibers in the injection-molded part to be manufactured that is present after the injection molding via a macroscopic simulation of the injection molding, and the macroscopic simulation of the injection molding taking place using macroscopic physical parameters of the fiber-reinforced plastic, wherein in the macroscopic simulation:

determining a temporal development of a fiber orientation tensor via a combination of two macroscopic models, a first temporal development of the fiber orientation tensor being determined via a first macroscopic model of the two macroscopic models based on shear flows, and a second temporal development of the fiber orientation tensor being determined via a second macroscopic model of the two macroscopic models based on elongation flows; and carrying out a weighting of an influence of the first macroscopic model and of the second macroscopic model on the temporal development of the fiber orientation tensor, determined in the simulation, based on a Manas-Zloczower number, limited to an upper value of 1 that corresponds to a pure elongation flow;

determining a load-bearing capacity of the injection-molded part; and comparing the determined load-bearing capacity to a predefined load-bearing capacity.

* * * * *